INVENTORS
EUGENE D. FORTNER,
WILLIAM L. FORTNER, JR.,
BY R. E. Geauque
ATTORNEY

UNITED STATES PATENT OFFICE 2,679,692

PORT GAUGE

Eugene D. Fortner, Sun Valley, and William L. Fortner, Jr., Glendale, Calif.

Application April 6, 1953, Serial No. 346,958

12 Claims. (Cl. 33—174)

1

This invention relates to port gauges, and more particularly to gauges of the type which are used to check the dimensions of ports used in hydraulic and other fluid systems.

The usual type of port has a thread section for receiving the fitting, and the top of the port is provided with a counterbore which is cylindrical in cross-section. A tapered surface connects the counterbore with the top of the port and the angularity of the tapered portion is specified in terms of the degree of countersink. Also, the maximum and minimum depths of the counterbore from the surface of the plug is specified, as well as the allowable maximum and minimum diameters of the counterbore. These dimensions are specified in terms of their tolerances, since the fitting to be inserted within the port is provided with an O-ring which rides in the counterbore and serves the purpose of a sealing ring. It is obvious that the counterbore and the taper must provide the correct space for the O-ring and thus the tolerances for the depth of the counterbore and diameter of the counterbore are specified. In addition to specifying the degree of countersink on the tapered section, the maximum and minimum dimensions for the outside diameter of the countersink are given in order to assure the proper space is provided by the tapered section.

Because of the number of port dimensions that must be checked, it has been necessary in the past to use a wide variety of instruments to check the various tolerances which are given for the port. For instance, the usual type of "go" and "no-go" gauge is used to check the tolerances on the diameter of the counterbore and, of course, this is a well known type of instrument. In order to check the depth of the counterbore below the surface of the port, a depth micrometer is usually used, and this instrument is difficult to handle because the tapered section at the top of the port makes it difficult to pick up the top surface of the port on the micrometer. In order to check the outside dimension of the countersink, it has been necessary to use either an ordinary micrometer or a pocket rule, and it is obvious that an accurate check on this dimension would be very difficult with a rule and that the ordinary type of micrometer would be difficult to manipulate, since there are no surfaces for the micrometer to work against and the end of the mircometer must be visually lined up with the circumference of the countersink. It is, therefore, apparent that in past practice, three or four separate measuring instruments were required in order to check the

2 dimensions of the usual port in order to determine whether or not they were in accordance with the specification for the port. This type of inspection is very time-consuming and is of a very low degree of accuracy.

In the present invention, a single measuring instrument is provided for checking most all of the specified dimensions of the usual type of port. This instrument is very easy to handle and gives an accurate measurement of the tolerances which are specified. A "go" gauge is provided at one end of the instrument or gauge, and a "no-go" is provided at the other end, for the purposes of checking the diameter of the counterbore. The "go" end of the gauge has a substantially rectangular projection extending therefrom at a distance from the end of the gauge corresponding to the minimum depth specified for the counterbore. When the projection is placed against the upper surface of the port, the length of the "go" end can be used to check the minimum allowed dimension for the depth of the counterbore, while at the same time checking the minimum dimension of the counterbore diameter. Two parallel sides of the rectangular projection are positioned a distance from the center of the gauge corresponding to the minimum dimension for the outside diameter of the countersink, while the other two parallel sides of the projection are positioned at a distance from the center of the gauge corresponding to the maximum dimension given for the outside diameter of the countersink. Therefore, the dimension of the outside diameter of the countersink can be check by simply observing if the circumference of the countersink can be observed at the edge of the two sides positioned the shorter distance from the center of the counterbore and if the circumference of the countersink is obscured by the two sides which are located the greater distance from the center of the bore. Because of the measurements which can be checked by the gauge of the present invention, it is no longer necessary to use pocket rules and various other types of measuring instruments such as micrometers, in order to check the dimensions of the usual type of ports to determine that they meet the specifications. While the maximum depth of the counterbore is also specified, this dimension can be accurately controlled and only occasional checks on isolated units are required with some suitable instrument.

It is, therefore, an object of the present invention to provide a port gauge which is capable of checking a number of port dimensions which have specified tolerances, in order to determine if these dimensions are within the tolerances.

A still further object of the invention is to provide a single port gauge which is capable of checking the diameter of the port counterbore as well as the minimum depth of this counterbore, and likewise, checking the outside diameter of the countersink of the port.

Another object of the invention is the provision of a single port gauge having a "go" portion for insertion into the counterbore of the port, which "go" portion also serves to check the minimum depth dimension of the counterbore, and serves to center the gauge so that the outside diameter of the countersink can be checked by the gauge.

A still further object of the invention is to provide a gauge having a rectangular projection which serves the purpose of limiting the amount of insertion of the "go" end of the gauge into the counterbore of the port and thereby giving a check of the minimum depth of the counterbore, and to further provide that the sides of the rectangular projection are spaced at such distances from the center of the gauge that two sides serve as the measuring device for the minimum outside diameter of the countersink and the other two sides serve as the measuring device for the maximum outside diameter of the countersink.

Another object of the invention is the provision of a single port gauge which is capable of checking all of the necessary dimensions of the port and which is very simple to handle and manipulate, and which gives very accurate results.

Other objects of the invention, not specifically enumerated above, will become readily apparent from the accompanying specification and drawings, in which.

Figure 1:
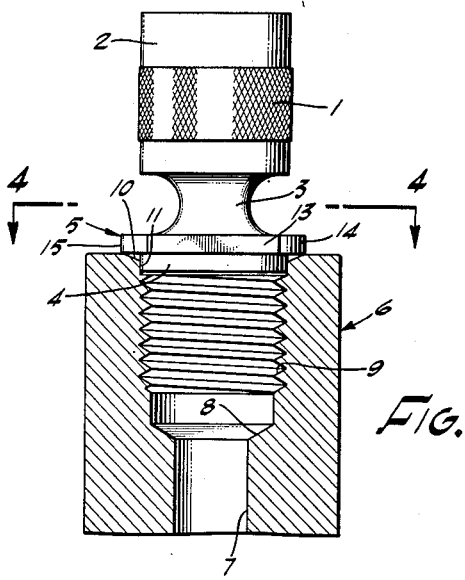
Fig. 1 is a vertical sectional view of the port being inspected, showing the port gauge of this invention in elevation, and with the "go" portion inserted in the counterbore of the port.
Figure 2:
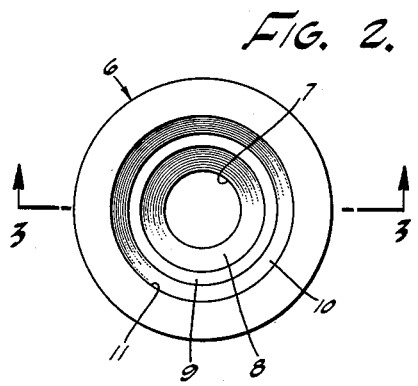
Fig. 2 is a top plan view of the port shown in Fig. 1, illustrating the countersink portion and the counterbore of the port.

The embodiment of the invention chosen for illustration in Fig. 1 has a knurled body portion 1 and a smooth end 2, which comprises the "no-go" portion of the gauge. The other end of the gauge has a neck portion 3 which connects with the smooth cylindrical end portion 4, forming the "go" portion of the gauge. A substantially rectangular projection 5 extends laterally from the "go" end of the gauge and is positioned between the "go" portion 4 and the neck 3. The usual type of port is illustrated in Fig. 1, and comprises a body section 6 having the usual passage 7, tapered portion 8, and threads 9 to receive the port fitting. A countersink 10 is provided at the top surface of the port and the tapered surface of the countersink connects with the counterbore 11, and together, the countersink and the counterbore serve to receive the O-ring which is provided on the fitting for sealing purposes. Therefore, it is necessary that the dimensions of the diameter of the counterbore and the depth of the counterbore be held within certain tolerances in order to compress the O-ring as required. Also, the outside diameter of the countersink must be held to certain tolerances in order to provide a correct amount of additional space for the sealing ring.

Figure 3:
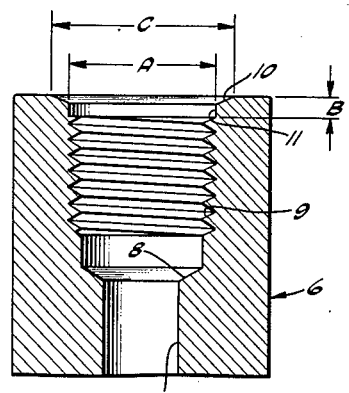
Fig. 3 is a vertical sectional view along line 3—3 of Fig. 2, and illustrating the various dimensions of the port which are to be controlled within the tolerances specified.
Figure 4:
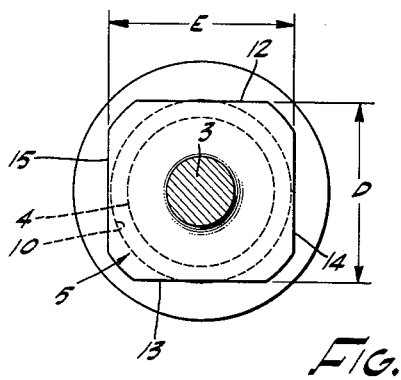
Fig. 4 is a horizontal view along line 4—4 of Fig. 1, and illustrating the manner in which the rectangular projection of the gauge is used to check the outside diameter of the countersink.

These critical dimensions are illustrated in Figs. 3 and 4 of the drawings. The dimension "A" represents the required diameter of the counterbore 11 and this dimension of the port must be such that the "go" portion 4 can be inserted within the counterbore in the manner illustrated in Fig. 1, and the "no-go" portion 2 cannot be inserted within the counterbore. If this is the case, the diameter of the counterbore is within the specified tolerances. The dimension "B" represents the required depth of the counterbore 11, which is specified. The minimum tolerance of this dimension can be checked at the same time as the "go" portion 4 is inserted within the counterbore, since the length of the "go" portion 4 from the rectangular projection 5 corresponds to the minimum tolerance for this dimension. As long as the "go" portion 4 can be inserted far enough into the counterbore so that the surface of projection 5 rests upon the upper surface of body 6, it is apparent that the minimum depth of the counterbore has been exceeded. However, if the surface of rectangular projection 5 cannot be brought flush against the top of body 6, the minimum tolerance of the depth dimension for the counterbore has not been met.

Figure 5:
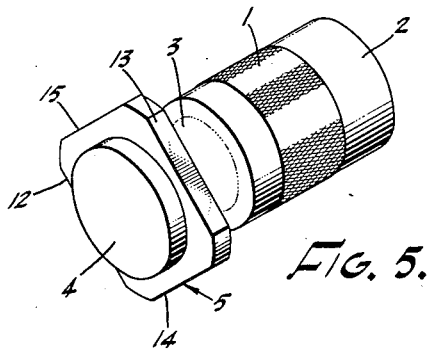
Fig. 5 is a perspective view of the port gauge shown in Fig. 1, and illustrating the relation of the various measuring portions of the gauge.

The rectangular projection 5 serves to check dimension "C," which is the dimension for the outside diameter of the countersink. In the specification for the port, the degree of taper on the countersink is specified, and by controlling the outside diameter of the countersink, the amount of the countersink can be determined. Referring to Fig. 5, it will be noted that the dimension "D" of projection 5 is slightly less than the dimension "E," and the dimension "D" corresponds to the minimum dimension for the outside diameter of the countersink, while the dimension "E" corresponds to the maximum dimension for this outside diameter. The difference between dimension "D" and dimension "E" is exactly equal to the specified tolerance for this dimension, and it is apparent that projection 5 is very nearly square. Thus, when the port gauge of this invention has the "go" portion 4 inserted within the counterbore 11, it will be possible to observe a small part of the outside circumference of countersink beyond the sides 12 and 13 of projection 5, while it will be impossible to observe a part of the circumference of the countersink at sides 14 and 15 of the projection 5. The appearance of the circumference of the countersink of a proper dimension is illustrated in Fig 4, wherein the flat projection 5 is in position to check this dimension and it is pointed out that the difference in dimensions "D" and "E" is slightly exaggerated for purposes of illustration, since in usual practice the tolerance in this dimension is in the neighborhood of .015 inch. Generally, the "go" portion 4 serves to center the rectangular projection 5 along the axis of passage 7, but since the dimension of portion 4 is the minimum diameter of the counterbore, a slight play in the projection 5 might be noticed. However, this is unimportant, since the operator of the gauge can quickly center the gauge by simply observing the circumference of the countersink about the sides of the projection 5 and will position the gauge so as to have sides 14 and 15 cover the countersink and sides 12 and 13 expose equal portions of the circumference of the countersink. In other words, if the operator can place the projection 5 so that portions of the outside circumference of the countersink can be seen at sides 12 and 13, the countersink diameter is within the minimum tolerance, and if the operator can place the projection 5 so that the circumference of the countersink cannot be seen at sides 14 and 15, then the diameter of the countersink is within the maximum tolerance.

Figure 6:
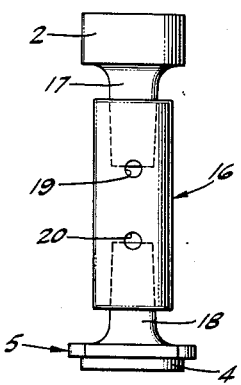
Fig. 6 is an elevational view of a modification of the subject invention, wherein the measuring portions of the gauge are detachable from the handle, so that the gauge portions for various sizes of ports can be inserted into the handle and removed therefrom.

While the gauge of this invention can be made in the form illustrated in Fig. 5, wherein the gauge portions are integral with the handle, it is also possible to have the gauge portions detachable in the manner illustrated in Fig. 6. In this embodiment, a single handle 16 has tapered and openings which can be square in cross-section or of any other suitable shape. The "go" and "no-go" ends of the gauge can be made separately from the handle and can be provided with extensions 17 and 18, respectively, which are likewise tapered in the same manner as the end openings in handle 16, so that they can be inserted into these openings. The extension 17 can be inserted into the handle a sufficient distance so that the end of the extension projects past opening 19 in the handle, while the projection 18 can be inserted so that its end projects past opening 20 in the handle, and, therefore, when it is desired to remove either end of the gauge from the handle, it is necessary only to drive a tapered pin into the corresponding opening and force the end outwardly of the handle. With the embodiment illustrated in Fig. 6, it is possible to use a single handle for a large number of gauges designed for various sized ports, and a series of gauges can be supplied for use with a single handle. The material of which the gauges are constructed may be selected so as to provide for minimum wear of the gauges and, of course, the utility of the gauge is not limited to use with any particular size of port. The gauge of this invention has been found to greatly reduce the time required to inspect the various sizes of ports and has been found to give more accurate results than can be obtained by the use of other instruments such as have been described. Various modifications of the gauge are contemplated and may obviously be resorted to by those skilled in the art without departing from the spirit and scope of the invention, as hereinafter defined by the appended claims.

What is claimed is:

1. A port gauge for checking the specified dimensions of the usual type of port, comprising a handle having a "go" longitudinally extending gauge portion at one end and a "no-go" longitudinally extending gauge portion at the other end, said "go" and "no-go" portions being of such dimensions as to check the diameter of the counterbore of the port upon insertion therein of one or both of said gauge portions, a substantially rectangular projection extending from said "go" portion at a distance from the end of said "go" portion corresponding to the minimum allowable dimension for the depth of the counterbore of said port, said "go" gauge portion having a longitudinal axis and said projection being perpendicular and centered with respect thereto, said substantially rectangular projection having two parallel sides positioned apart a distance corresponding to the minimum dimension for the outside diameter of the countersink of the port and having two other parallel sides positioned apart a distance corresponding to the maximum dimension for the outside diameter of the countersink.

2. A port gauge for checking the specified dimensions of a port, comprising a handle having a "go" longitudinally extending gauge portion at one end and a "no-go" longitudinally extending gauge portion at the other end, said "go" and "no-go" portions being of such dimensions as to check the diameter dimension of the counterbore of the port upon insertion therein of one or both of said gauge portions, a substantially rectangular projection located a distance from the end of the "go" portion corresponding to the minimum depth for the counterbore, said projection being perpendicular to the longitudinal centerline of said "go" gauge portion and having two parallel sides equally spaced from said centerline of said "go" gauge portion and separated a distance equal to the minimum dimension for the outside diameter of the countersink of the port, and having two other parallel sides equally spaced from said centerline of said "go" gauge portion and separated a distance equal to the maximum dimension for the outside diameter of the countersink.

3. A port gauge for checking the specified dimensions of a port, comprising a handle having a "go" longitudinally extending gauge portion at one end and a "no-go" longitudinally extending gauge portion at the other end for checking the diameter of the counterbore of the port upon insertion therein of one or both said gauge portions, a projection extending from the "go" portion of the gauge and located a distance from the end of the "go" portion equal to the minimum allowable depth of the counterbore above the surface of the port, said projection being perpendicular to the longitudinal axis of said "go" portion and having two parallel sides located equal distances from said axis of the "go" gauge portion so that the distance between the sides corresponds to the minimum outside diameter of the countersink of the port, and having two other parallel sides located equal distances from said axis of the "go" gauge portion so that the distance between said other two sides corresponds to the maximum outside diameter of the countersink.

4. A port gauge for checking the specified dimensions of a port, comprising a "go" longitudinally extending gauge portion at one end and a "no-go" longitudinally extending gauge portion at the other end, a projection located at a distance from the "go" portion and corresponding to the minimum allowable depth of the counterbore of the port from the upper surface of the port, said projection being perpendicular to the longitudinal axis of said "go" gauge portion and having two sides equally spaced from said axis of said "go" gauge portion and separated a distance corresponding to the minimum outside allowable diameter of the countersink of the port, and two other sides equally spaced from said axis of the "go" gauge portion and separated a distance corresponding to the maximum allowable diameter of the countersink, said "go" portion serving to check the minimum allowable diameter and depth of the counterbore and to centrally locate the gauge so that the circumference of the countersink can be observed at the sides of said projection.

5. A port gauge for use in checking the specified dimensions of a port, comprising a "no-go" longitudinally extending cylindrical portion located at one end and a "go" longitudinally extending cylindrical portion located at the other end, said portions being utilized to check the diameter of the counterbore of the port, a projection extending from the "go" end of the gauge and located a distance from the "go" and equal to the minimum allowable depth of the counterbore, said projection being perpendicular to the longitudinal axis of said "go" portion and having two sides located at equal distances on opposite sides of said axis of said gauge and being separated from each other by a distance equal to the minimum allowable dimension for the outside diameter of the countersink of the port, and having two other sides located at equal distances on opposite sides of said axis of said gauge and separated from each other by a distance equal to the maximum allowable dimension for the outside diameter of the countersink, said projection serving to limit the insertion of the "go" portion of the gauge into the counterbore so that the "go" portion can check the minimum depth dimension of the counterbore, said "go" portion serving to center the projection about the port so that a small part of the circumference of the countersink can be observed adjacent each of the first-mentioned two sides of said projection while the other two sides will completely obscure the circumference of the countersink.

6. A port gauge for use in inspecting port dimensions, comprising a handle having a longitudinally extending cylindrical "go" portion at one end and a longitudinally extending cylindrical "no-go" portion at the other end for checking the diameter dimension of the circular counterbore of the port, a rectangular projection extending from the "go" portion and located at a distance from the end of the "go" portion an amount equal to the minimum depth dimension for the counterbore, said rectangle being perpendicular to the center of said "go" portion and having its center at the axis of said "go" portion and its shorter sides spaced apart a distance equal to the maximum allowable dimension for the outside diameter of the countersink, the two longer sides being spaced apart a distance corresponding to the minimum outside diameter of the countersink, said projections serving to limit the insertion of the "go" portion into the counterbore so that the length of the "go" portion can check the minimum depth dimension of said counterbore and said "go" portion will serve to center said projection about said port so that parts of the circumference of the countersink can be seen adjacent the longer side of said projection and no portions of the circumference of said countersink can be seen adjacent the shorter sides of said projection.

7. A port gauge as defined in claim 6, wherein said "go" and "no-go" portions are removable from said handle so that said handle can be used for a full range of gauge sizes.

8. A port gauge for use in checking the dimensions of a port, comprising a longitudinally extending cylindrical "no-go" portion located at one end and a longitudinal extending cylindrical "go" portion located at the other end for checking the diameter dimension of the counterbore of the port, a projection extending from the "go" portion of said gauge and normal to the longitudinal axes of the "go" portion and located a distance from the end of the "go" portion equal to the minimum allowable depth of the counterbore, so that when the "go" portion is inserted in the counterbore the projection will engage the upper surface of the port, said projection having two sides equally spaced from said axis and located a distance apart corresponding to the minimum allowable outside diameter of the countersink of the port, and having two other sides equally spaced from said axis and located a distance apart coresponding to the maximum allowable outside diameter of the countersink so that when the sides of said projection are centered about the port axis by inserting the "go" portion in the counterbore, the diameter of the countersink can be checked by visually observing the portions of the countersink adjacent the sides of the said extension.

9. A port gauge for use in checking the dimension of a port comprising a longitudinally extending cylindrical portion located at one end of the gauge and formed of a diameter for permitting said portion to be snugly received in the counterbore of the port, and a projection extending from said portion in a plane perpendicular to the longitudinal axis thereof and having two sides equally spaced from said axis and located apart a distance corresponding to the minimum allowable outside diameter of the countersink of the port and having two other sides equally spaced from said axis and located a distance apart corresponding to the maximum allowable outside diameter of the countersink, said cylindrical portion serving to center said projection with respect to said countersink and said sides of said projection serving as a visual check on the outside diameter of said countersink.

10. A port gauge as defined in claim 9, wherein said projection is located a distance from the end of said cylindrical portion corresponding to the minimum allowable depth of the counterbore.

11. A port gauge as defined in claim 9, wherein said cylindrical portion has a diameter corresponding to the minimum allowable diameter of the counterbore, said cylindrical portion thus forming a "go" gauge for checking the minimum diameter of the counterbore.

12. A port gauge as defined in claim 9, wherein said cllindrical portion has a diameter corresponding to the minimum allowable diameter of the counterbore, said cylindrical portion thus forming a "go" gauge for checking the minimum diameter of the counterbore, said projection being located from the end of the "go" gauge a distance corresponding to the minimum allowable depth of the counterbore so that the length of the "go" gauge can check the minimum depth dimension for the counterbore.

References Cited in the file of this patent

UNITED STATES PATENTS

| Number | Name | Date |
| --- | --- | --- |
| 2,128,215 | Walker | Aug. 23, 1938 |
| 2,197,756 | Brescka | Apr. 23, 1940 |
| 2,377,020 | Lundeberg | May 29, 1945 |
| 2,514,794 | Prince | July 11, 1950 |